United States Patent
Hsu

(10) Patent No.: US 7,579,198 B2
(45) Date of Patent: Aug. 25, 2009

(54) METHOD FOR MAKING BACKLIGHT MODULE

(75) Inventor: Ming-Fu Hsu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 5 days.

(21) Appl. No.: 11/692,924

(22) Filed: Mar. 29, 2007

(65) Prior Publication Data
US 2008/0101084 A1    May 1, 2008

(30) Foreign Application Priority Data
Oct. 30, 2006    (CN) .......................... 2006 1 0201045

(51) Int. Cl.
*H01L 21/00* (2006.01)
(52) U.S. Cl. .................. 438/22; 362/555; 362/581; 362/611; 362/607; 362/612; 438/25; 438/26; 438/29
(58) Field of Classification Search ............... 362/607, 362/612, 800, 555, 581, 611, 613, 632, 633, 362/634, 217.14, 249.01, 249.02, 456; 438/22, 438/25, 26, 29
See application file for complete search history.

(56) References Cited
U.S. PATENT DOCUMENTS
5,461,377 A * 10/1995 Oono et al. .................... 341/22
5,698,866 A * 12/1997 Doiron et al. ................. 257/99
6,776,504 B2 * 8/2004 Sloan et al. .................. 362/240
2003/0214818 A1 * 11/2003 Ehara et al. ................. 362/558
2004/0004827 A1 * 1/2004 Guest .......................... 362/31
2004/0042233 A1 * 3/2004 Suzuki et al. ............... 362/561
2005/0062140 A1 * 3/2005 Leung et al. ................ 257/678
2005/0185421 A1 * 8/2005 Hayakawa .................. 362/612
2006/0071085 A1 * 4/2006 Philyaw et al. .............. 235/494
2006/0092665 A1 * 5/2006 Kim et al. ................... 362/612

* cited by examiner

*Primary Examiner*—Sharon E Payne
*Assistant Examiner*—Mary Zettl
(74) *Attorney, Agent, or Firm*—Frank R. Niranjan

(57) ABSTRACT

An exemplary method for making a backlight module, the method includes steps in following order: providing a transparent base sheet and at least one light emitting diode; punching the base sheet to form an aperture therein; fixing the at lease one light emitting diode in the aperture, the at least one light emitting diode and an inner side surface of the aperture cooperatively defining a space; injecting an adhesive into the space between the at least one light emitting diode and the inner side surface of the aperture; solidifying the adhesive; and trimming the base sheet with the at least one light emitting diode in the aperture to form the backlight module.

7 Claims, 7 Drawing Sheets

METHOD FOR MAKING BACKLIGHT MODULE

BACKGROUND OF THE INVENTION

1. Field of the Invention

The present invention relates to backlight modules, particularly, to an edge-lighting type backlight module for use in, for example, a liquid crystal display (LCD), and methods for making the backlight modules.

2. Discussion of the Related Art

In a liquid crystal display device, a liquid crystal is a substance that does not itself radiate light. Instead, the liquid crystal relies on light received from a light source, thereby displaying data images. In the case of a typical liquid crystal display device, a backlight module powered by electricity supplies the needed light. Generally, backlight modules can be classified into an edge lighting type or a bottom lighting type based upon the location of lamps within the device.

Referring to FIG. 6, a typical edge lighting type backlight module 10 includes a frame 11, a light reflective plate 12, a plurality of light emitting diodes 13, a light guide plate 14 and at least one optical plate 15. The frame 11 includes four sidewalls 114 that connect with each other to form a receiving space 112. The light reflective plate 12, the light guide plate 14 and the optical plate 15 are stacked in that order, and are mounted in the receiving space 112 together. The light guide plate 14 includes a light input surface 141, and a light output surface 142 adjoining the light input surface 141. An inner side surface of the sidewalls 114 facing the light input surface 141 defines a plurality of grooves 111 therein. The light emitting diodes 13 are received in the corresponding grooves 111 of the sidewall 114.

Referring to FIG. 7, each light emitting diode 13 includes a base 131, a semiconductor chip 132 fixed on the base 131, and a transparent resin member 133 sealed with the semiconductor chip 132 at one side of the base 131. Also referring to FIG. 6, the light guide plate 14 includes a light input surface 141, and a light output surface 142 adjoining the light input surface 141. The transparent resin member 133 of each of the light emitting diodes 13 faces the light input surface 141. In use, light from the light emitting diodes 13 passes through the light input surface 141 and enters the light guide plate 14. The light is reflected and refracted in the light guide plate 14, and finally surface light is outputted from the light output surface 142.

Generally, it is difficult to assemble the light emitting diodes 13 to be in continuous contact with the light input surface 141 of the light guide plate 14. A space still exists between the light input surface 141 and the transparent resin members 133 of the light emitting diodes 13. Because a refractive index of the transparent resin members 133 of the light emitting diodes 13 is relatively larger than of the refractive index of air, when light from the semiconductor chip 132 passes through the space, the light undergoes total reflection at the space. As a result, the light energy utilization ratio of the backlight module 10 is reduced.

What is needed, therefore, is a backlight module that overcomes the above mentioned disadvantages. Methods for making the backlight module are also desired.

SUMMARY

A method for making a backlight module, the method includes: providing a transparent base sheet and at least one light emitting diode; punching the base sheet to form an aperture therein; fixing the at lease one light emitting diode in the aperture, the at least one light emitting diode and an inner side surface of the aperture cooperatively defining a space; injecting an adhesive into the space between the at least one light emitting diode and the inner side surface of the aperture; solidifying the adhesive; and trimming the base sheet with the at least one light emitting diode in the aperture to form the backlight module.

Other advantages and novel features will become more apparent from the following detailed description of the preferred embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present backlight module and method for making the backlight module. Moreover, in the drawings, like reference numerals designate corresponding parts throughout the several views, and all the views are schematic.

DETAILED DESCRIPTION OF THE PREFERRED EMBODIMENTS

Reference will now be made to the drawings to describe preferred embodiments of the present backlight module and methods for making the backlight module, in detail.

Figure 1:
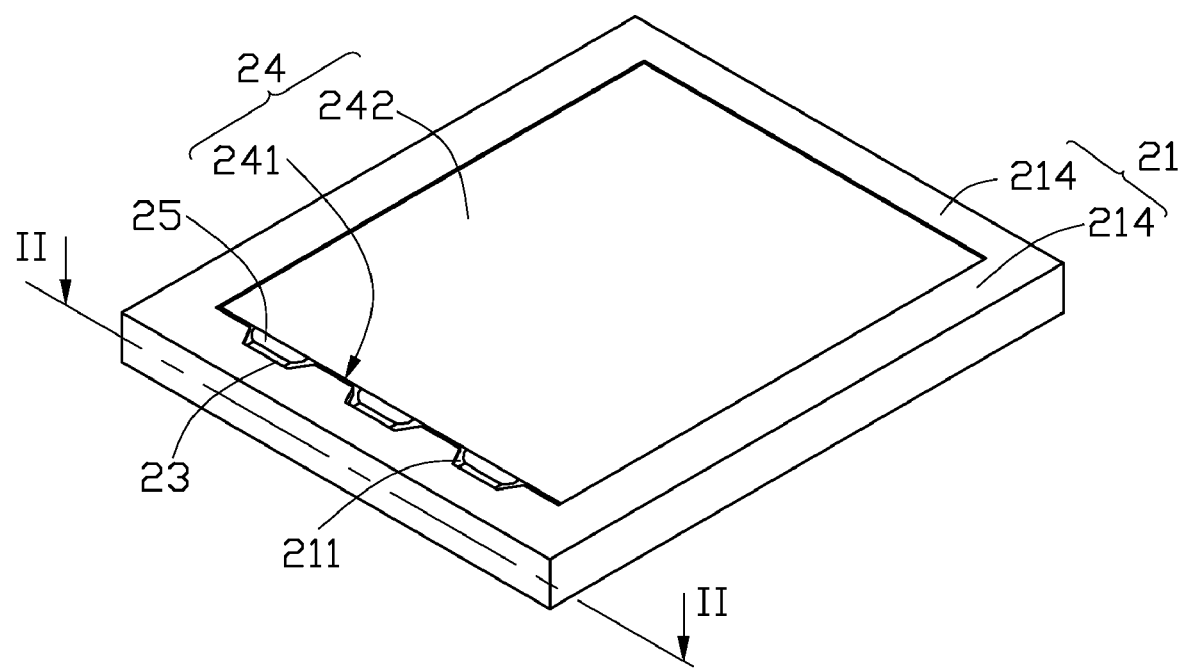
FIG. 1 is an assembled, isometric view of a backlight module according to a first preferred embodiment of the present invention.
Figure 2:
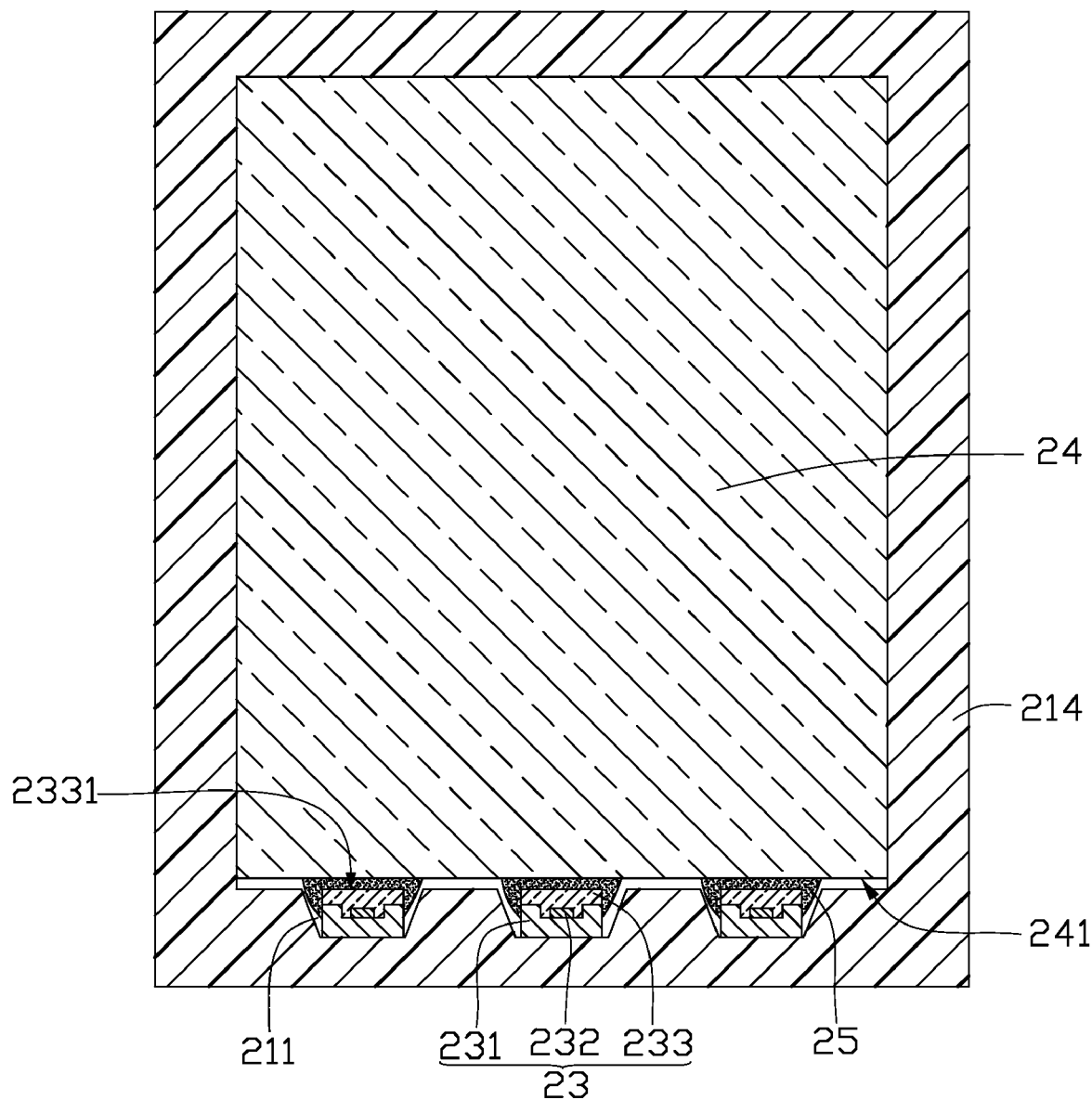
FIG. 2 is a cross-sectional view of the backlight module of FIG. 1, taken along II-II line thereof.

Referring to FIGS. 1 and 2, a backlight module 20 in accordance with a first preferred embodiment of the present invention is shown. The backlight module 20 includes a frame 21, three light emitting diodes 23, a light guide plate 24, and an adhesive member 25. The frame 21 includes four sidewalls 214 connected with each other defining a receiving space (not labeled). The light guide plate 24 includes a light input surface 241, and a light output surface 242 adjoining the light input surface 241. The light guide plate 24 is mounted in the receiving space. An inner side surface of the sidewall 214 facing the light input surface 241 defines a plurality of grooves 211.

The light guide plate 24 has a thin body, and a thickness of the light guide plate 24 is preferably in a range from 0.075 millimeters to about 0.8 millimeters. A material of the light guide plate 24 is selected from polymethyl methacrylate (PMMA), polycarbonate (PC), and any other suitable transparent resin materials. Preferably, the light guide plate 24 is made of transparent resin materials with relatively high heat-resistant capabilities, such as PC that can endure 150° C. temperatures, or modified PMMA with a heat-resistant agent uniformly dispersed in the PMMA.

The light emitting diodes 23 are correspondingly received in the grooves 211. Each light emitting diode 23 includes a base 231, a semiconductor chip 232 fixed on the base 231, and a transparent resin member 233 sealing the semiconductor chip 232 on a side of the base 231. The transparent resin member 233 of each of the light emitting diodes 23 includes a light-emitting surface 2331 facing the light input surface 241. In alternative embodiments, the three light emitting diodes 23 are welded on a flexible printed circuit board (not shown) in an array along a direction parallel to the light input surface 241, and the flexible printed circuit board are fixed to a bottom surface of the light guide plate 24 with a double-coated adhesive tape (not shown). Accordingly, the three light emitting diodes 23 are positioned adjacent to the light guide plate 24 securely.

The light emitting surface 2331 of the light emitting diodes 23 and the light input surface 241 of the light guide plate 24 cooperatively define a plurality of spaces between them. The adhesive member 25 fills the spaces between the light-emitting surface 2331 of the light emitting diodes 23 and the light input surface 241 of the light guide plate 24. The adhesive member 25 is transparent, and is solidified by solidifying either an UV-curable adhesive or a thermal curable adhesive. Preferably, a refractive index of the adhesive member 25 equals to or closely matches a refractive index of the transparent resin members 233 of the light emitting diodes 23.

In use, the light from the light emitting diodes 23 passes through the adhesive member 25 and enters the light guide plate 24 via the light input surface 241. The light is reflected and refracted in the light guide plate 24, and finally surface light is outputted from the light output surface 242. Because the refractive index of the adhesive member 25 almost equals to that of the transparent resin members 233 of the light emitting diodes 23, a critical angle of total reflection at the light-emitting surface 2331 is reduced. Therefore, a frequency of light from the semiconductor chip 232 being reflected back is decreased. A light energy utilization efficiency of the backlight module 20 is improved. Furthermore, the light emitting diodes 23 can be positioned and fixed tightly to the light guide plate 24 by the adhesive member 25.

It is to be understood that, if fluorescent particles are dispersed in the adhesive member 25, the backlight module 20 can provide colored light according to characteristics of the fluorescent particles. For example, if the light emitting diode 23 is a blue colored light emitting diode, and yttrium aluminum garnet fluorescent particles are uniformly dispersed in the adhesive member 25, white light can be outputted from the light output surface 242. Therefore, either colored light or white light outputted from the backlight module 20 can obtained efficiently by employing the adhesive member 25 with different fluorescent particles.

Figure 3:
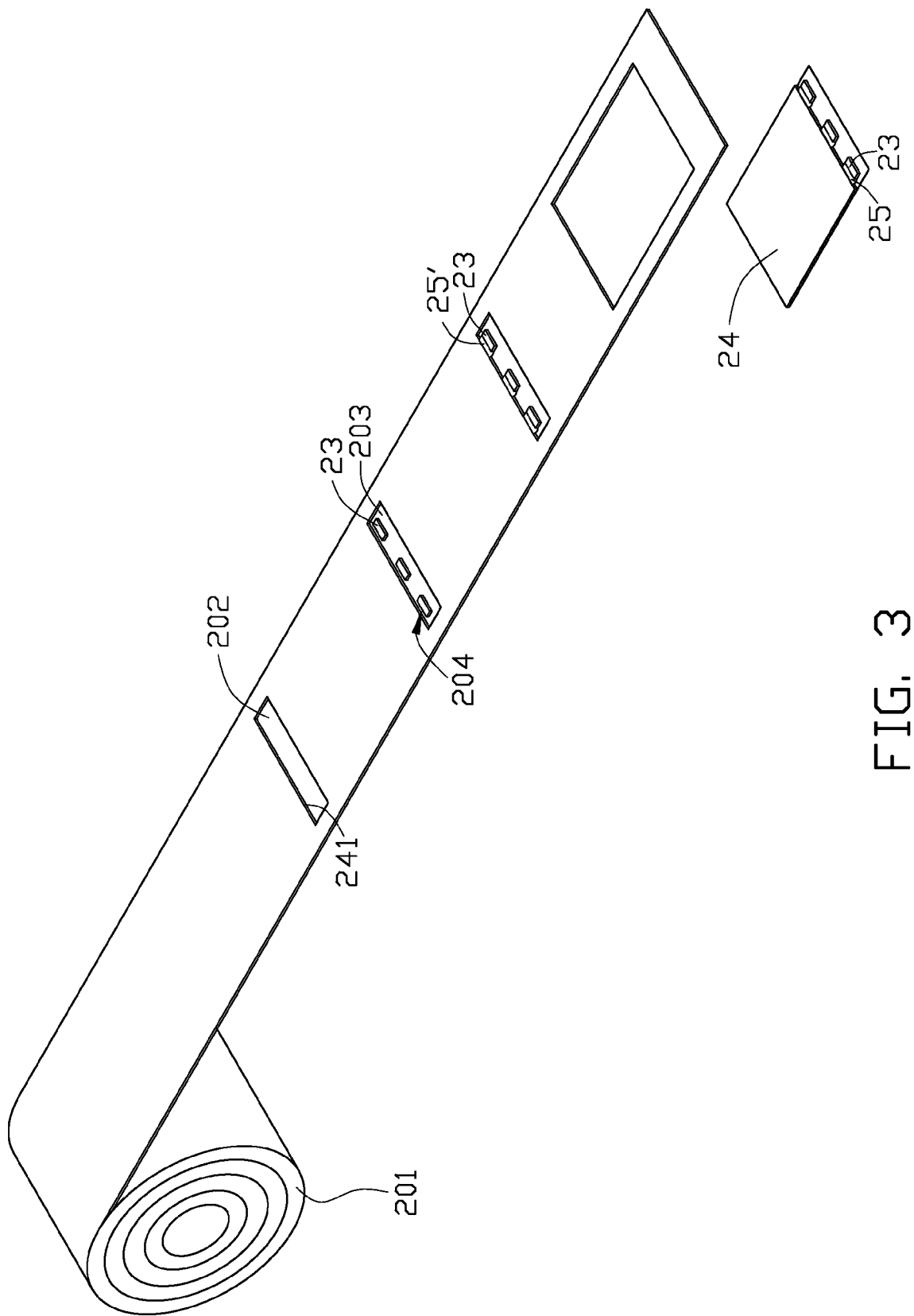
FIG. 3 is a diagram of a process for making the backlight module of FIG. 1 without a frame.

FIG. 3 is a diagram of a process for making the backlight module 20 of FIG. 1 without the frame 21. The process mainly includes the following six steps.

Step one: a transparent base sheet 201 is provided. A thickness of the light guide plate 24 is preferably in the range from 0.075 millimeters to about 0.8 millimeters. A material of the base sheet 201 is preferably selected from a group consisting of polymethyl methacrylate (PMMA), polycarbonate (PC), and other suitable transparent resin materials. In this embodiment, the base sheet 201 is a rolled-up sheet. The base sheet 201 can be continuously fed to a punching machine (not shown) by a number of rolling devices (not shown).

Step two: the transparent base sheet 201 is punched by the punching machine to form an elongated aperture 202 in the transparent base sheet 201. A light input surface 241 is defined at an inner side surface of the aperture 202. A shape of the aperture 202 can be configured according to a shape and/or an amount of the light emitting diodes 23.

Step three: the Three light emitting diodes 23 are provided, and are regularly arranged in the aperture 202 with the transparent resin members 233 of each of the light emitting diodes 23 facing the light input surface 241. In this embodiment, the light emitting diodes 23 are welded on a flexible printed circuit board (FPCB hereafter) 203 in an array along a direction parallel to the light input surface 241. The FPCB 203 includes a plurality of electrical components (not shown) formed on a surface to control actuations of the three light emitting diodes 23 or other components. The light emitting diodes 23 are electrically connected with electrical components of the FPCB 203. A part of the FPCB 203 may be fixed to a bottom surface of the transparent base sheet 201 with a double-coated adhesive tape (not shown), thus the light emitting diodes 23 is securely positioned in the aperture 202. Generally, a space 204 would exist between the light input surface 241 and the transparent resin members 233.

Step four: an adhesive 25' is injected into the space 204 between the light input surface 241 and the transparent resin members 233 by a dispenser (not shown). The adhesive 25' can be either an UV-curable adhesive or a thermal curable adhesive. Alternatively, the adhesive 25' may further be modified UV-curable adhesive and modified thermal curable adhesive. In this embodiment, the adhesive 25 is an UV-curable adhesive that can be efficiently solidified.

Step five: the adhesive 25' between the light input surface 241 and the light emitting diodes 23 is solidified to yield the adhesive member 25 by UV-light (ultraviolet-light) solidifying method.

Step six: the base sheet 201 with the light emitting diodes 23 positioned in the aperture 202 is trimmed by a die cut machine (not shown) according to a predetermined design to form the backlight module 20. Each backlight module 20 includes the light guide plate 24, three light emitting diodes 23, and the adhesive member 25. The light emitting diodes 23 are disposed adjacent to the light input surface 241 of the light guide plate 24. The adhesive member 25 is located between the light emitting diodes 23 and the light guide plate 24. In this embodiment, the backlight modules 20 are continuously punched out of the base sheet 201 during a punching procedure applied by the die cut machine.

In an exemplary embodiment, a method for making the backlight module 20 of FIG. 1 includes following steps. Firstly, the light guide plate 24 and three light emitting diodes 23 are provided. Secondly, the three light emitting diodes 23 are positioned adjacent to the light guide plate 24, the light-emitting surface 2331 of the light emitting diode 23 facing the light input surface 241 of the light guide plate 24. Thirdly, a dispenser (not shown) injects an adhesive 25' to fill a space cooperatively defined by the light-emitting surface 2331 and the light input surface 241. Finally, the adhesive 25' is solidified to form the backlight module 20.

In other exemplary embodiments, a method for making the backlight module 20 of FIG. 1 includes following steps. Firstly, the frame 21, three light emitting diodes 23 and the light guide plate 24 are provided. Secondly, the light guide plate 24 and the three light emitting diodes 23 are assembled into the frame 21 with the light-emitting surface 2331 of the light-emitting diode 23 facing the light input surface 241 of the light guide plate 24. The light-emitting surface 2331 and the light input surface 241 cooperatively defines a space. Thirdly, an adhesive 25' is injected into the space. Finally, the adhesive 25' is solidified to form the adhesive member 25. Accordingly, the backlight module 20 is manufactured.

Figure 4:
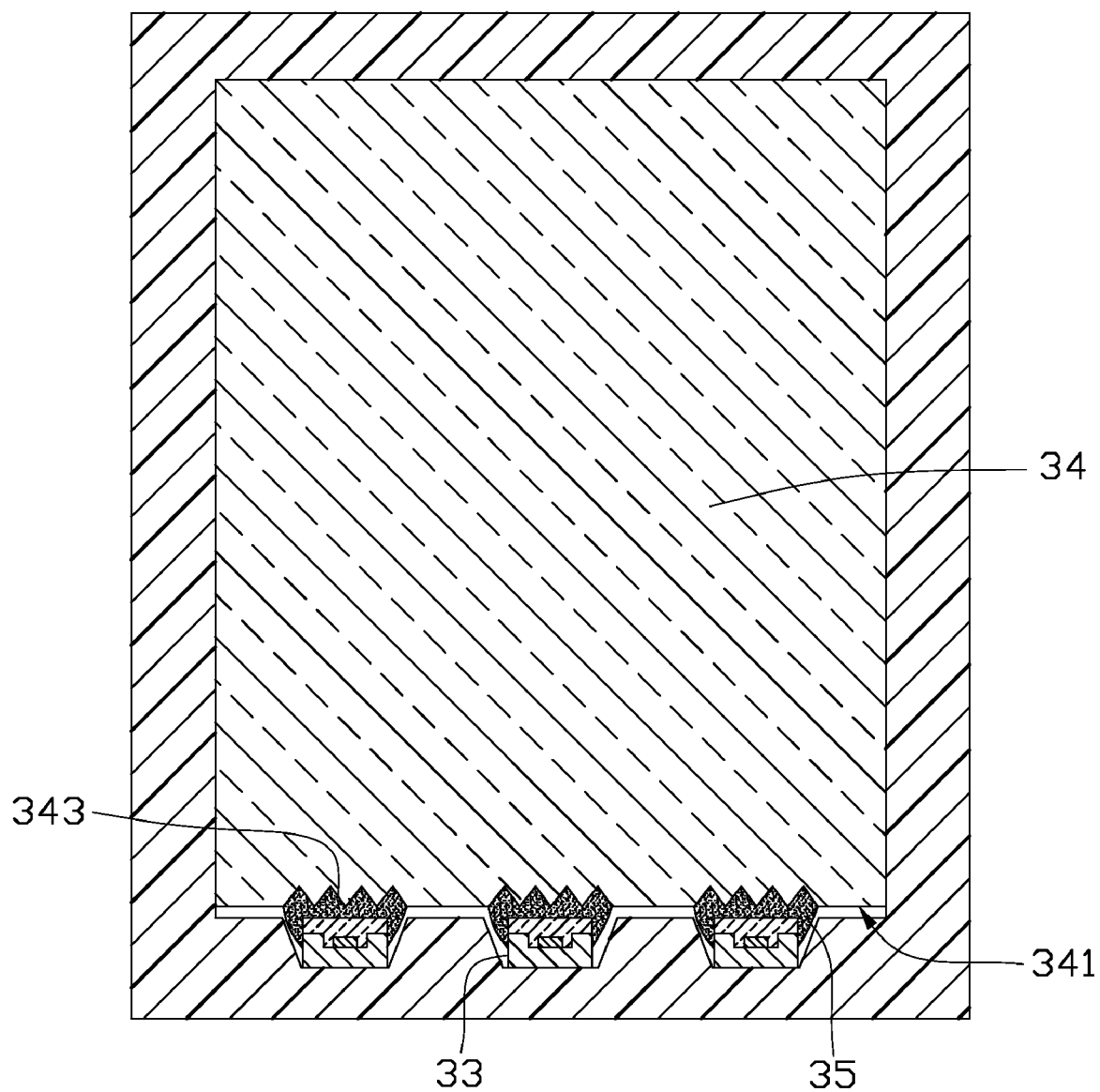
FIG. 4 is a cross-sectional view of a backlight module according to a second preferred embodiment of the present invention.

Referring to FIG. 4, a backlight module 30, in accordance with a second preferred embodiment of the present invention, is similar in principle to the backlight module 20. However, the backlight module 30 includes a light guide plate 34 and three light emitting diodes 33. The three light emitting diodes 33 are regularly arranged adjacent to a light input surface 341 of the light guide plate 34. A plurality of V-shaped depressions 343 are defined in parts of the light input surface 341 corresponding to the light emitting diodes 33. The backlight module 30 further includes a plurality of adhesive members 35 to fill spaces defined between the light emitting diodes 33 and the light input surface 341, and to connect the light emitting diodes with the light guide plate 34. The V-shaped depressions 343 can eliminate shadows that may otherwise form adjacent to the light input surface 341, such that a uniformity of light output from the backlight module 30 is increased.

Figure 5:
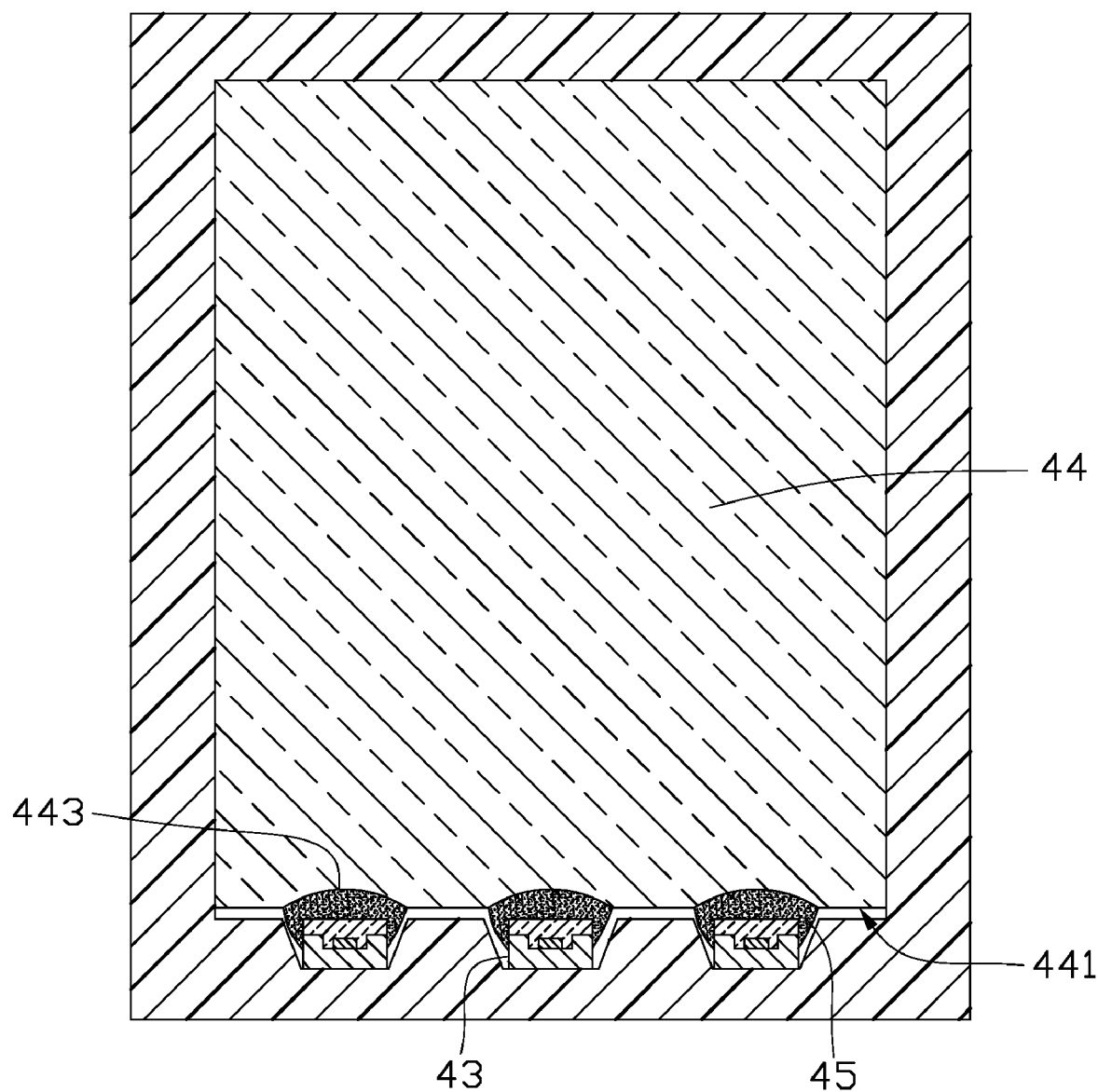
FIG. 5 is a cross-sectional view of a backlight module according to a third preferred embodiment of the present invention.
Figure 6:
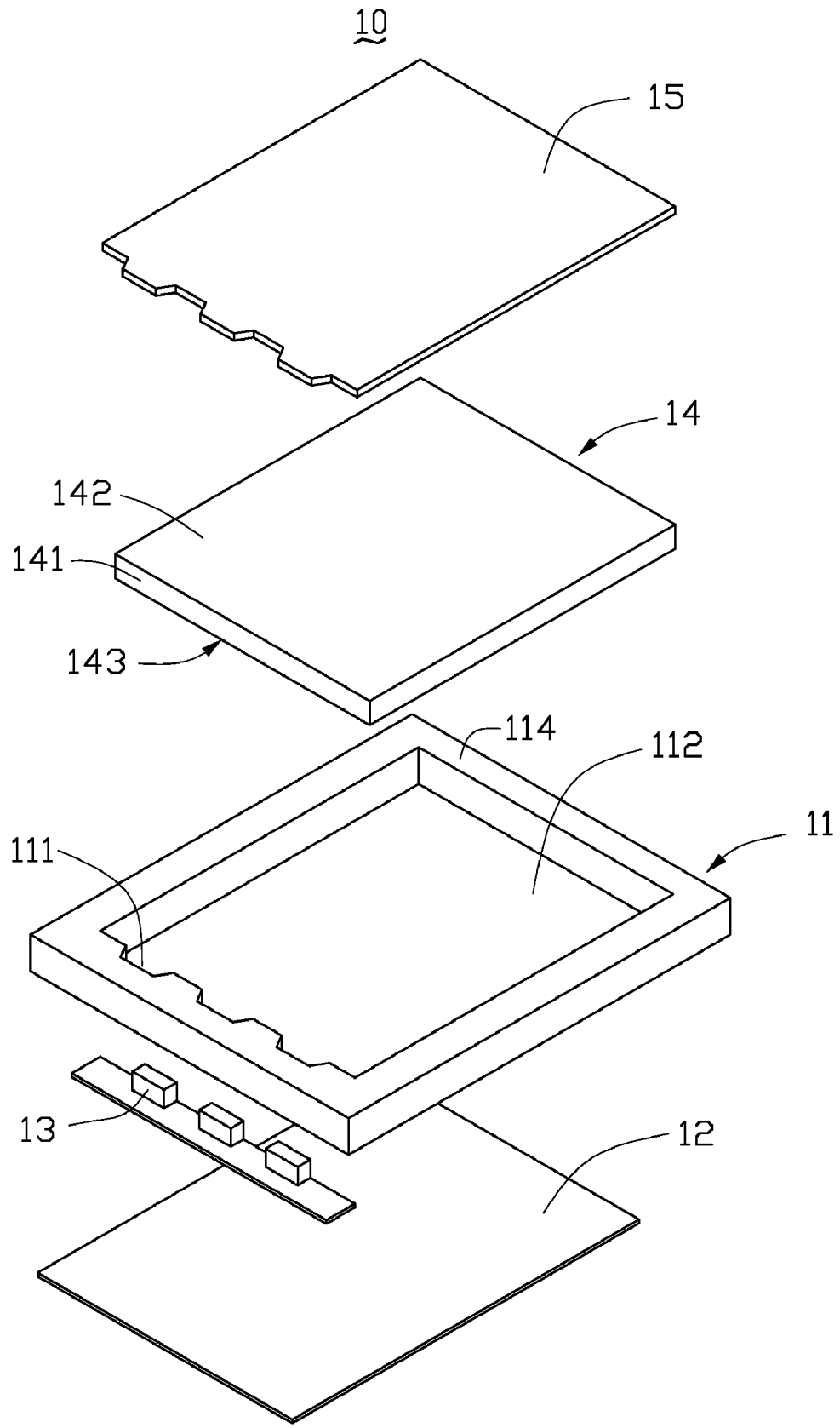
FIG. 6 is an exploded, isometric view of a conventional backlight module.
Figure 7:
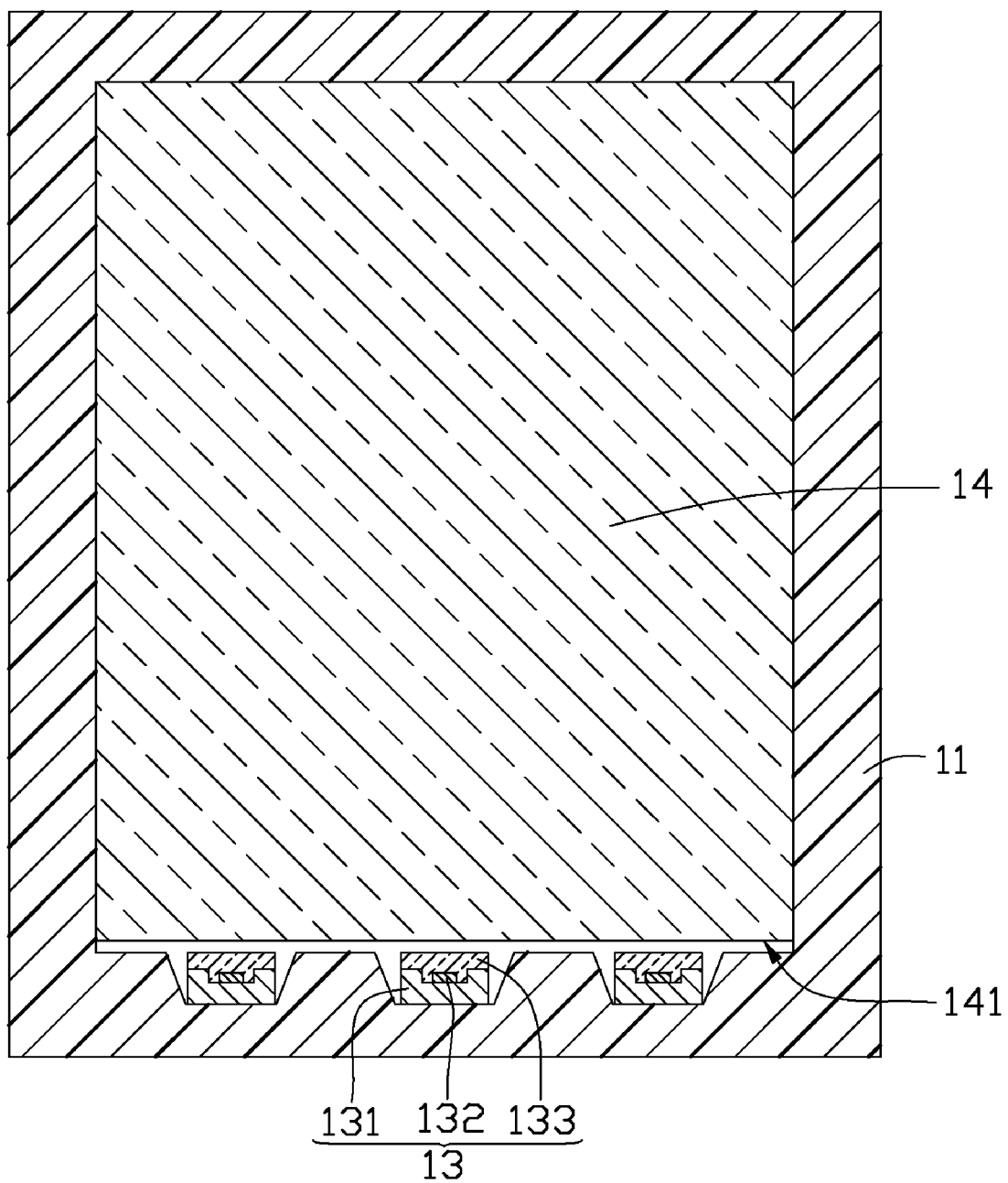
FIG. 7 is a cross-sectional view of the backlight module of FIG. 6.

Referring to FIG. 5, a backlight module 40, in accordance with a third preferred embodiment of the present invention, is similar in principle to the backlight module 20. However, the backlight module 40 includes a light guide plate 44 and three light emitting diodes 43. The three light emitting diodes 43 are regularly arranged adjacent to a light input surface 341 of the light guide plate 44. A plurality of arcuate depressions 443 are defined in parts of the light input surface 441 corresponding to the light emitting diodes 43. The backlight module 40 further includes a plurality of adhesive members 45 to fill spaces defined between the light emitting diodes 43 and the light input surface 441, and to connect the light emitting diodes with the light guide plate 44. The arcuate depressions 443 can eliminate shadows that may otherwise form adjacent to the light input surface 441, such that a uniformity of light output from the backlight module 40 is increased.

It is noted that the scope of the present backlight module is not limited to those described in the embodiments even though the numbers and shapes of the V-shaped depressions 343, and the arcuate depressions 443 are illustrated specifically. Furthermore, the backlight module can further include other microstructures that are not described in the embodiments, such as V-shaped protrusions, arcuate protrusions and so on.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A method for making a backlight module, the method comprising steps in the following order:
   (1) providing a transparent base sheet and at least one light emitting diode;
   (2) punching the base sheet to form an aperture therein;
   (3) fixing the at least one light emitting diode in the aperture, the at least one light emitting diode and an inner side surface of the aperture cooperatively defining a space;
   (4) injecting an adhesive into the space between the at least one light emitting diode and the inner side surface of the aperture;
   (5) solidifying the adhesive; and
   (6) trimming the base sheet with the at least one light emitting diode in the aperture to form the backlight module.

2. The method for making a backlight module as claimed in claim 1, wherein the transparent base sheet is one of a coiled sheet or planar sheet.

3. The method for making a backlight module as claimed in claim 2, wherein a material of the transparent base sheet is selected from polymethyl methacrylate, polycarbonate, modified polymethyl methacrylate that a heat-resistant agent is uniformly dispersed in the polymethyl methacrylate, and any suitable transparent resin materials.

4. The method for making a backlight module as claimed in claim 1, wherein the at least one light emitting diode is welded on a flexible printed circuit board in an array along a direction parallel to the light input surface, and the flexible printed circuit board are fixed to a bottom surface of the base sheet with a double-coated adhesive tape.

5. The method for making a backlight module as claimed in claim 1, wherein the adhesive is injected into the space by a dispenser.

6. The method for making a backlight module as claimed in claim 1, wherein the adhesive is solidified by one of ultraviolet-light solidifying method and thermal solidifying method.

7. The method for making a backlight module as claimed in claim 6, wherein the adhesive is selected from a group consisting of UV-curable adhesive, modified UV-curable adhesive having a plurality of fluorescent particles dispersed in the UV-curable adhesive, thermal curable adhesive and modified thermal curable adhesive having a plurality of fluorescent particles dispersed in the thermal curable adhesive.

* * * * *